(12) United States Patent
Dubrovsky et al.

(10) Patent No.: US 9,577,983 B2
(45) Date of Patent: Feb. 21, 2017

(54) METHOD AND APPARATUS TO PERFORM MULTIPLE PACKET PAYLOADS ANALYSIS

(71) Applicant: Dell Software Inc., Round Rock, TX (US)

(72) Inventors: Aleksandr Dubrovsky, San Mateo, CA (US); John Everett Gmuender, San Jose, CA (US); Boris Yanovsky, Saratoga, CA (US); Roman Yanovsky, Los Altos, CA (US); Shunhui Zhu, San Jose, CA (US)

(73) Assignee: DELL SOFTWARE INC., Round Rock, TX (US)

( * ) Notice: Subject to any disclaimer, the term of this patent is extended or adjusted under 35 U.S.C. 154(b) by 0 days.

(21) Appl. No.: 14/747,860

(22) Filed: Jun. 23, 2015

(65) Prior Publication Data

US 2015/0295894 A1   Oct. 15, 2015

Related U.S. Application Data

(63) Continuation of application No. 14/064,597, filed on Oct. 28, 2013, now Pat. No. 9,065,848, which is a
(Continued)

(51) Int. Cl.
*H04L 29/06* (2006.01)
*H04L 12/28* (2006.01)
(Continued)

(52) U.S. Cl.
CPC ....... *H04L 63/0254* (2013.01); *H04L 12/2874* (2013.01); *H04L 47/34* (2013.01);
(Continued)

(58) Field of Classification Search
CPC .......... H04L 63/02254; H04L 12/2874; H04L 47/34; H04L 47/365; H04L 63/1416; H04L 63/145; H04L 67/06
(Continued)

(56) References Cited

U.S. PATENT DOCUMENTS 5,414,833 A   5/1995   Hershey et al.
5,796,942 A   8/1998   Esben
(Continued)

FOREIGN PATENT DOCUMENTS

| EP | 1 122 932 | 8/2001 |
|---|---|---|
| EP | 1 528 743 | 5/2005 |
| WO | WO 97/39399 | 10/1997 |

OTHER PUBLICATIONS

Aggarwal, N., "Improving the Efficiency of Network Intrusion Detection Systems", Indian Institute of Technology, May 3, 2006, pp. 1-40.
(Continued)

*Primary Examiner* — Michael S McNally
(74) *Attorney, Agent, or Firm* — Polsinelli LLP

(57) ABSTRACT

A method and apparatus for identifying data patterns of a file are described herein. In one embodiment, an exemplary process includes, but is not limited to, receiving a data packet of a data stream containing a file segment of a file originated from an external host and destined to a protected host of a local area network (LAN), the file being transmitted via multiple file segments contained in multiple data packets of the data stream, and performing a data pattern analysis on the received data packet to determine whether the received data packet contains a predetermined data pattern, without waiting for a remainder of the data stream to arrive. Other methods and apparatuses are also described.

20 Claims, 13 Drawing Sheets

Related U.S. Application Data continuation of application No. 13/587,748, filed on Aug. 16, 2012, now Pat. No. 8,584,238, which is a continuation of application No. 12/913,668, filed on Oct. 27, 2010, now Pat. No. 8,272,057, which is a continuation of application No. 11/112,252, filed on Apr. 21, 2005, now Pat. No. 7,835,361, which is a continuation-in-part of application No. 10/964,871, filed on Oct. 13, 2004, now Pat. No. 7,600,257.

(51) Int. Cl.
*H04L 12/801* (2013.01)
*H04L 12/805* (2013.01)
*H04L 29/08* (2006.01)

(52) U.S. Cl.
CPC .......... *H04L 47/365* (2013.01); *H04L 63/145* (2013.01); *H04L 63/1416* (2013.01); *H04L 67/06* (2013.01)

(58) Field of Classification Search
USPC ......................................................... 726/13
See application file for complete search history.

(56) References Cited

U.S. PATENT DOCUMENTS

| | | | |
|---|---|---|---|
| 5,945,933 | A | 8/1999 | Kalkstein |
| 6,088,803 | A | 7/2000 | Tso et al. |
| 6,108,782 | A | 8/2000 | Fletcher et al. |
| 6,119,236 | A | 9/2000 | Shipley |
| 6,178,448 | B1 | 1/2001 | Gray et al. |
| 6,219,706 | B1 | 4/2001 | Fan et al. |
| 6,449,723 | B1 | 9/2002 | Elgressy et al. |
| 6,851,061 | B1 | 2/2005 | Holland et al. |
| 7,058,821 | B1 | 6/2006 | Parekh et al. |
| 7,134,143 | B2 | 11/2006 | Stellenberg et al. |
| 7,152,164 | B1 | 12/2006 | Loukas |
| 7,185,368 | B2 | 2/2007 | Copeland |
| 7,304,996 | B1 | 12/2007 | Swenson et al. |
| 7,600,257 | B2 | 10/2009 | Dubrovsky |
| 7,835,361 | B1 | 11/2010 | Dubrovsky |
| 7,849,502 | B1 | 12/2010 | Bloch et al. |
| 8,272,057 | B1 | 9/2012 | Dubrovsky |
| 8,321,939 | B1 | 11/2012 | Dubrovsky |
| 8,578,489 | B1 | 11/2013 | Dubrovsky |
| 8,584,238 | B1 | 11/2013 | Dubrovsky |
| 9,065,848 | B2 | 6/2015 | Dubrovsky |
| 9,100,427 | B2 | 8/2015 | Dubrovsky |
| 2002/0083331 | A1 | 6/2002 | Krumel |
| 2003/0018914 | A1 | 1/2003 | Cheng et al. |
| 2003/0028666 | A1 | 2/2003 | Hanner |
| 2003/0084328 | A1 | 5/2003 | Targuini et al. |
| 2003/0110208 | A1* | 6/2003 | Wyschogrod ..... G06F 17/30985 709/202 |
| 2003/0145228 | A1 | 7/2003 | Suuronen et al. |
| 2003/0154399 | A1 | 8/2003 | Zuk et al. |
| 2004/0049596 | A1 | 3/2004 | Schuehler et al. |
| 2004/0093513 | A1 | 5/2004 | Cantrell et al. |
| 2004/0098617 | A1 | 5/2004 | Sekar |
| 2004/0123155 | A1 | 6/2004 | Etoh et al. |
| 2004/0199790 | A1 | 10/2004 | Lingafelt et al. |
| 2004/0255163 | A1 | 12/2004 | Swimmer et al. |
| 2005/0050362 | A1 | 3/2005 | Peles |
| 2005/0091514 | A1 | 4/2005 | Fukumoto et al. |
| 2005/0120243 | A1 | 6/2005 | Palmer et al. |
| 2005/0135380 | A1 | 6/2005 | Sahita et al. |
| 2005/0187916 | A1 | 8/2005 | Levin et al. |
| 2005/0216770 | A1 | 9/2005 | Rowett et al. |
| 2005/0229246 | A1 | 10/2005 | Rajagopal et al. |
| 2005/0262556 | A1* | 11/2005 | Waisman ............ H04L 63/0236 726/22 |
| 2006/0020595 | A1 | 1/2006 | Norton et al. |
| 2006/0069787 | A1 | 3/2006 | Sinclair |
| 2006/0077979 | A1 | 4/2006 | Dubrovsky et al. |
| 2007/0058551 | A1 | 3/2007 | Brusotti et al. |
| 2008/0034073 | A1 | 2/2008 | McCloy et al. |
| 2008/0126794 | A1 | 5/2008 | Wang et al. |
| 2008/0235755 | A1 | 9/2008 | Blaisdell et al. |
| 2009/0271613 | A1 | 10/2009 | Brabson |
| 2014/0053264 | A1 | 2/2014 | Dubrovsky |
| 2014/0059681 | A1 | 2/2014 | Dubrovsky |
| 2015/0350231 | A1 | 12/2015 | Dubrovsky |

OTHER PUBLICATIONS

Bellovin, S., "Firewall-Friendly FTP," Network Working Group, RFC No. 1579, AT&T Bell Laboratories, Feb. 1994, http://www.ietf.org/rfc1579.txt?number=1579, downloaded Jul. 15, 2002, 4 pages.

Blyth, "Detecting Intrusion", School of Computing, University of Glamorgan, 14 pages. 2005.

Branch, Joel; Bivens, Alan; Chan, Chi Yu; Lee, Taek Kyeun; and Szymanski, Boleslaw, "Denial of Service Intrusion Detection Using Time Dependent Deterministic Finite Automania", Oct. 17, 2002, RPI Graduate research Conference 2002.

Gateway Anti-Virus, Anti-Spyware and Intrusion Prevention Service, Unified Threat Management, Intelligent Real-time Protection, © 2005, 2 pp.

Giles et al., C., "Learning a Class of Large Finite State Machines With a Recurrent Neural Network", Neural Networks, vol. 8, No. 9, pp. 1359-1365, 1995.

Holzmann et al., G., "A Minimized Automation Representation of Reachable States", Int J. STTT 2, pp. 270-278, 1999.

Kruegal, Christopher; and Toth, Thomas, "Using decision trees to improve signature-based intrusion detection," Sep. 8, 2003, RAID 2003: recent Advance in Intrusion Detection. 20 Pages.

Juniper Networks:: Attack Detection, www.juniper.net/products/intrusion/detection.html, 7 pages.

Juniper Networks:: Attack Detection and Prevention, www.juniper.net/products/intrusion/ 2 pages.

Juniper Networks:: Attack Prevention, www.juniper.net/products/intrusion/prevention.html, downloaded Jun. 11, 2004, 2 pages.

Juniper Networks:: Architecture, www.juniper.net/products/intrusion/architecture.html, 3 pages.

Juniper Networks:: Juniper Networks NetScreen-IDP 10/100/500/1000, Intrusion Detection and Prevention, Spec Sheet, Apr. 2004, 2 pages.

Lucas, Simon M., "Learning Deterministic Finite Automata with a Smart State Labeling Evolutionary Algorithm," IEEE Transaction on Pattern Analysis and Machine Intelligence, vol. 27, No. 7, Jul. 2005, pp. 1063-1074.

Roberts, Paul, "NetScreen announced deep inspection firewall," www.newfusion.com/news/2003/1020newscannou.html, 5 pages.

Roesch, Martin and Green, Chris, "Snort Users Manual," Snort Release 2.0.0, M. Roesch, C. Green Copyright 1998-2003 M. Roesch, Copyright 2001-2003 C.Green, Copyright 2003 Sourcefire, Inc. dated Dec. 8, 2003 (53 pgs).

"SonicWALL Complete Anti-Virus, Automated and Enforced Anti-Virus Protection," © 2005, 2 pp.

"SonicWALL Content Filtering Service," Comprehensive Internet Security™, © 2005, 2 pp.

"SonicWALL Content Security Manager Series, Easy-to-use, Affordable, Content Security and Internet Threat Protection," © 2006, Dec. 2006, 4 pp.

"SoniceWALL Endpoint Security: Anti-Virus, Automated and Enforced Anti-Virus and Anti-Virus and Anti-Spyware Protection," © 2007, Mar. 2007, 2 pp.

SonicWALL Internet Security Appliances, "Content Security Manager Integrated Solutions Guide", Version 3.0, © 2007, 160 pp.

SonicWALL Internet Security Appliances, "SonicOS 3.8 Standard Administrator's Guide", © 2007, 362 pp.

"SonicOS Standard 3.8.0.2 Release Notes, SonicWALL Secure AntiVirus Router 80 Series," SonicWALL, Inc., Software Release: Apr. 11, 2007, 13 pp.

Snort.org, "The Open Source Network Intrusion Detection System", www.snort.org/about.html, 2 pages.

(56) References Cited

OTHER PUBLICATIONS

"The Ultimate Internet Sharing Solution, WinProxy, User Manual," Copyright 1996-2002 Osistis Software, Inc., dated Feb. 2002 (290 pgs).
Van Engelen, R., "Constructing Finite State Automata for High-Performance XML Web Services," International Symposium on Web Services and Applications, 2004, pp. 1-7.
Villa, Oreste. Feb. 2008. IBM Research Report: Too many words, too little time: Accelerating real-time keyword scanning with multi-core processors. Retrieved from http://domino.research.ibm.com/library/cyberdignsf/papers/9 EB4740B4B0739CF852573F5005A6311/$FileIrc24488.pdf. Retrieval data Mar. 5, 2012.
Taiwan Application No. 093133045, Search Report dated Aug. 5, 2011.
European Application No. EP 04 02 5579, Search Report dated May 23, 2005.
Taiwan Application No. 093133045, Office Action dated Sep. 8, 2011.
U.S. Appl. No. 10/964,871; Office Action mailed Jan. 9, 2009.
U.S. Appl. No. 10/964,871; Office Action mailed Jul. 16, 2008.
U.S. Appl. No. 10/964,871; Final Office Action mailed Mar. 20, 2008.
U.S. Appl. No. 10/964,871; Office Action mailed Oct. 2, 2007.
U.S. Appl. No. 11/112,252; Office Action mailed Mar. 1, 2010.
U.S. Appl. No. 11/112,252; Final Office Action mailed Oct. 19, 2009.
U.S. Appl. No. 11/112,252; Office Action mailed Mar. 31, 2009.
U.S. Appl. No. 11/112,252; Final Office Action mailed Nov. 14, 2008.
U.S. Appl. No. 11/112,252; Office Action mailed Apr. 29, 2008.
U.S. Appl. No. 12/547,860; Final Office Action mailed Sep. 26, 2011.
U.S. Appl. No. 12/547,860; Office Action mailed May 3, 2011.
U.S. Appl. No. 12/547,860; Final Office Action mailed Dec. 10, 2010.
U.S. Appl. No. 12/547,860; Office Action mailed Aug. 31, 2010.
U.S. Appl. No. 13/491,484; Office Action mailed May 9, 2013.
U.S. Appl. No. 14/071,146; Final Office Action mailed Dec. 19, 2014.
U.S. Appl. No. 14/071,146; Office Action mailed Aug. 15, 2014.
U.S. Appl. No. 12/913,668; Final Office Action mailed Nov. 2, 2011.
U.S. Appl. No. 12/913,668; Office Action mailed Jun. 24, 2011.
U.S. Appl. No. 13/587,748; Office Action mailed. May 14, 2013.
U.S. Appl. No. 14/064,597; Final Office Action mailed Dec. 10, 2014.
U.S. Appl. No. 14/064,597; Office Action mailed Aug. 14, 2014.
U.S. Appl. No. 14/818,215, Aleksandr Dubrovsky, Method and Apparatus to Perform Multiple Packet Payloads Analysis, filed Aug. 4, 2015.

* cited by examiner

METHOD AND APPARATUS TO PERFORM MULTIPLE PACKET PAYLOADS ANALYSIS

CROSS-REFERENCE TO RELATED APPLICATIONS

The present application is a continuation and claims the priority benefit of U.S. patent application Ser. No. 14/064,597 filed Oct. 28, 2013, now U.S. Pat. No. 9,065,848, which is a continuation and claims the priority benefit of U.S. patent application Ser. No. 13/587,748 filed Aug. 16, 2012, now U.S. Pat. No. 8,584,238, which is a continuation and claims the priority benefit of U.S. patent application Ser. No. 12/913,668 filed Oct. 27, 2010, now U.S. Pat. No. 8,272,057, which is a continuation of and claims the priority benefit of U.S. patent application Ser. No. 11/112,252 filed Apr. 21, 2005, now U.S. Pat. No. 7,835,361, which is a continuation-in-part and claims the priority benefit of U.S. patent application Ser. No. 10/964,871 filed Oct. 13, 2004, now U.S. Pat. No. 7,600,257, the disclosures of which are incorporated herein by reference.

BACKGROUND OF THE INVENTION

Field of the Invention

The present invention relates generally to data pattern analysis. More particularly, this invention relates to identifying data patterns of a file.

Description of the Related Art

Today, in many security products, pattern matching is used to prevent many types of security attacks. For example, some existing desktop virus scanning may include scanning files against certain recognizable patterns. These files usually come from mail attachments and website downloads. These desktop applications are simpler in that by the time the pattern matching is performed, the input has been all accumulated in the correct order. The situation is more complicated for gateway products, such as firewalls, attempting to match patterns for other purposes, such as deep packet inspection. Some of these products scan for patterns over Transport Control Protocol (TCP) packets. Since TCP usually breaks down application data into chunks called TCP segments, the full pattern may reside in several TCP segments. One conventional approach is to reassemble all TCP packets together into one large chunk and perform pattern matching on this chunk, similar to scanning files. The disadvantage of this approach is that this approach requires processing to reassemble, and it further requires memory to store the intermediate result before pattern matching can take place.

To further complicate the problem, many security attacks exhibit more than one pattern, and thus, multiple pattern matching has to be performed in order to successfully screen out these attacks. Such a collection of patterns is called a signature. For example, an attack signature may contain a recognizable header and a particular phrase in the body. To detect such an attack, the detection mechanism has to match all the patterns in the signature. If only part of the signature is matched, false positives may occur. As such, the term "attack pattern" is used to refer to a single pattern or a signature.

When such attacks are transported over TCP, the contents, and therefore the recognizable patterns, may exist in different TCP segments. In fact, even a single pattern is more often split over several segments. Therefore, two problems have to be solved at the same time. On one hand, the detection mechanism has to scan each pattern across multiple segments, and on the other hand, the detection mechanism also has to scan across patterns. One existing approach is to reassemble all packets and scan for each pattern in sequence. This approach is inefficient in terms of processing time and memory usage because scanning cannot start until all packets are received and reassembled and extra memory is needed to store the packets received.

Another major problem in pattern matching is that the packets may arrive out of order. Again, using TCP as an example, the application data is broken into what TCP considers the best sized chunks to send, called a TCP segment or a TCP segment. When TCP sends a segment, it maintains a timer and waits for the other end to acknowledge the receipt of the segment. The acknowledgement is commonly called an ACK. If an ACK is not received for a particular segment within a predetermined period of time, the segment is retransmitted. Since the IP layer transmits the TCP segments as IP datagrams and the IP datagrams can arrive out of order, the TCP segments can arrive out of order as well. Currently, one receiver of the TCP segments reassembles the data if necessary, and therefore, the application layer receives data in the correct order.

An existing Intrusion Detection/Prevention System (IPS) typically resides between the two ends of TCP communication, inspecting the packets as the packets arrive at the IPS. The IPS looks for predetermined patterns in the payloads of the packets. These patterns are typically application layer patterns. For example, the pattern might be to look for the word "windows". However, the word may be broken into two TCP segments, e.g., "win" in one segment and "dows" in another segment. If these two segments arrive in the correct order, then IPS can detect the word. However, if the segments arrive out of order, which happens relatively often, then the IPS may first receive the segment containing "dows", and have to hold this segment and wait for the other segment. A typical approach is for the IPS to force the sender to re-transmit all the segments from the last missing one, hoping that the segments may arrive in order the second time. One disadvantage of this approach is the additional traffic in between and the additional processing on both ends of the TCP communication.

Similarly, when a file is transferred over a network, the file is typically broken into multiple file segments, which may be carried via multiple data packets (e.g., TCP packets) during the transmission. A typical approach for data pattern analysis is to wait and store the whole file in a local memory and then perform the data pattern analysis on the whole file. However, such an approach may not be feasible if the file is relatively large and the data pattern analysis may be limited to the local memory to buffer the file.

SUMMARY OF THE PRESENTLY CLAIMED INVENTION

A method and apparatus for identifying data patterns of a file are described herein. In one embodiment, an exemplary process includes, but is not limited to, receiving a data packet of a data stream containing a file segment of a file originated from an external host and destined to a protected host of a local area network (LAN), the file being transmitted via multiple file segments contained in multiple data packets of the data stream, and performing a data pattern analysis on the received data packet to determine whether the received data packet contains a predetermined data pattern, without waiting for a remainder of the data stream to arrive.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1A:
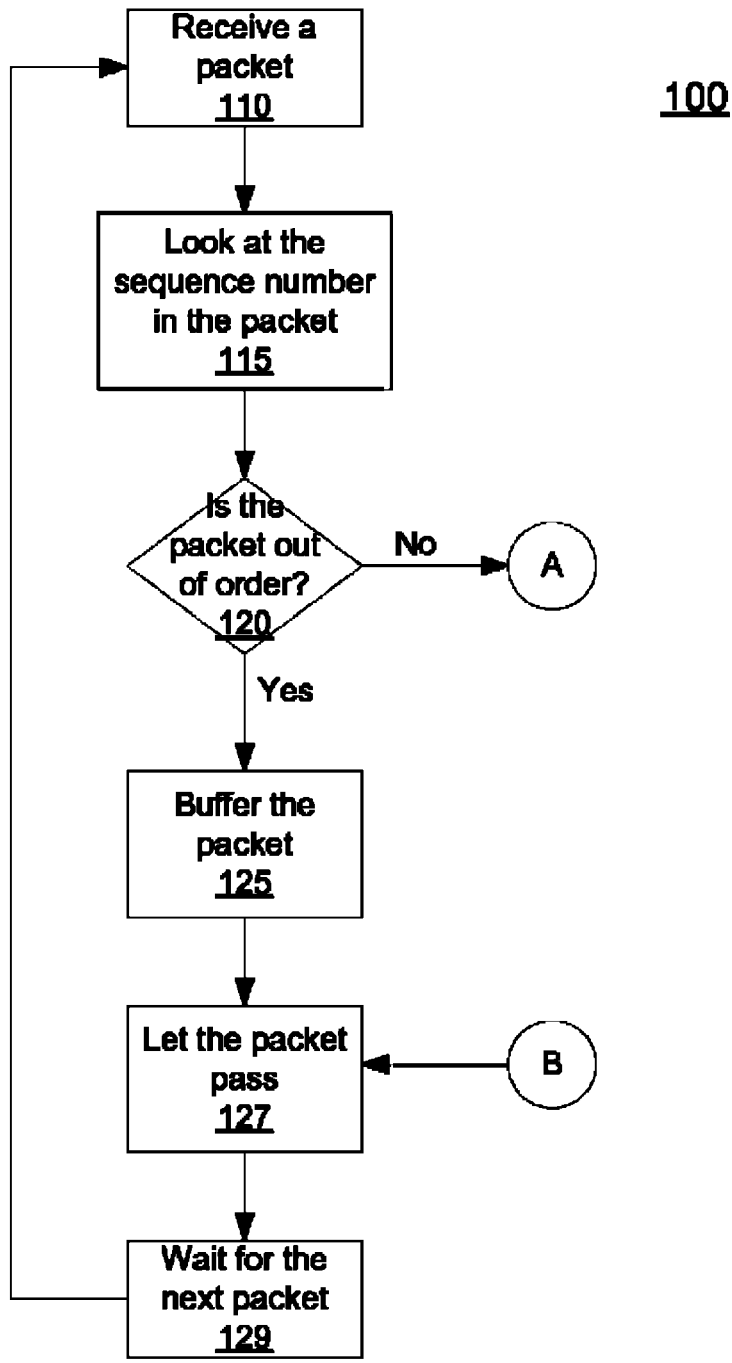
FIGS. 1A and 1B are flow diagrams illustrating an exemplary process for performing multiple packet payload analysis according to one embodiment.

A method and apparatus for identifying data patterns of a file are described herein. In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Exemplary Non-Intrusive Reassembly of Packets

As described above, after a client and a server establish a TCP connection, the sender breaks the data into multiple TCP segments, puts them in multiple IP packets, and sends them to the recipient. These IP packets can easily arrive out-of-order. In fact, two adjacent IP packets from the sender may take completely different routes in the network to reach the recipient. As a result, the time of their arrival, hence the order may be difficult to predict.

Typically, if the packets arrive in order, the detection system can scan them against the patterns to see whether there is a match. However, if the packets arrive out of order, for example, packets 2 and 3 arrive before packet 1, the situation becomes complicated. By examining a sequence number associated with the packets (e.g., sequence number of a TCP header), packet 1 may be noted as missing. Since pattern matching has to be done in a correct order, a typical detection system cannot perform pattern matching before it receives packet 1. Thus, a typical method is to force the sender to retransmit all three packets. This is usually done by repeatedly acknowledging to the sender the sequence number of the packet before packet 1. When the sender receives such repeated acknowledges, it will retransmit packets 1-3. However, such retransmission may cause further delay of the processes.

According to one embodiment of the invention, referring to the above example, when packets 2 and 3 arrive, for example, at a network access device (e.g., gateway device or IPS), packets 2 and 3 may be forwarded to the intended destination (e.g., a protected host). Meanwhile, a copy of the packets 2 and 3 may be maintained within the network access device, for example, a local storage of the network access device. In this example, it is assumed that packets 1-3 together form an attack package. At this time, the destination only receives packets 2 and 3, the TCP stack (of the destination) will not pass these packets to an application layer where the attach typically takes place since they are out of order.

When packet 1 eventually arrives at the network access device, the IPS now has all three packets and it can put them in the correct order and perform the data pattern matching against a predetermined data pattern. If the packets 1-3 contain a pattern that matches the predetermined data pattern, packet 1 will be blocked by the IPS. Since the destination does not have packet 1, the attack cannot be launched and eventually the destination has to drop packets 2-3 already received. If the predetermined data pattern is not found in packets 1-3, packet 1 will be forwarded to the destination.

Figure 1B:
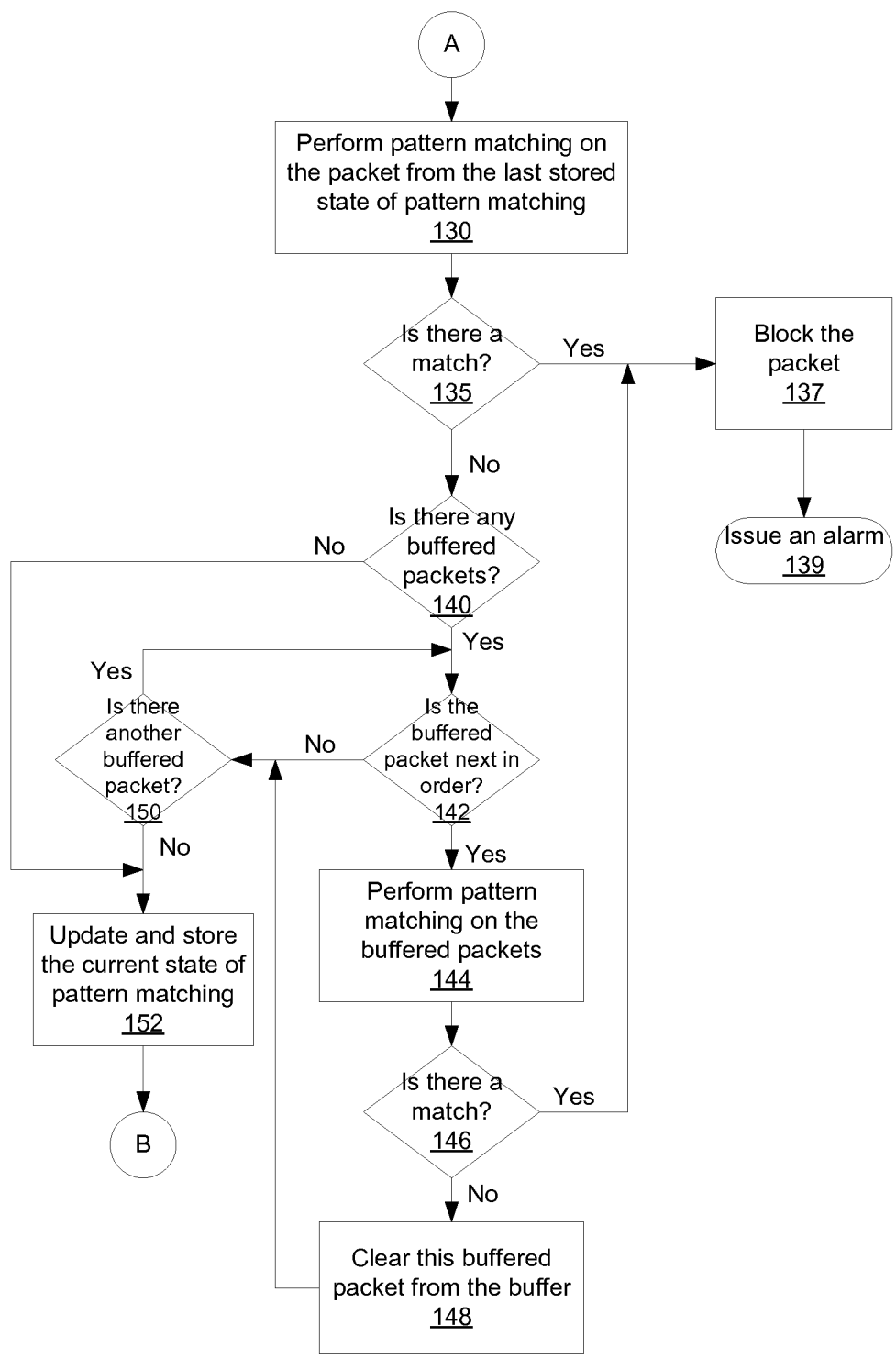

FIGS. 1A and 1B are flow diagrams illustrating an exemplary process for performing a multiple packet payload analysis according to one embodiment. In the following discussion, "data packet" and "packet" are used interchangeably. Examples of a packet include a TCP packet. The exemplary process 100 may be performed by processing logic that may include hardware (e.g., circuitry, dedicated logic, etc.), software (such as is run on a general-purpose computer system, a server, a router, or a combination of both. For example, the exemplary process 100 may be performed by a network access device interfacing one network with another network, such as, for example, a gateway device or a switch/routing device. Alternatively, the exemplary process 100 may be performed by a dedicated device or an appliance device of a network, such as, for example, an intrusion detection/prevention system (IPS).

Referring to FIG. 1A, processing logic receives a packet (processing block 110). Then processing logic checks the sequence number in the packet (processing block 115) and determines whether the packet is out of order (processing block 120). If the packet is out of order, processing logic buffers the packet (processing block 125) and allows the packet to pass. In some embodiments, processing logic makes a copy of the out-of-order packet and temporarily stores the copy in a storage device, such as a cache. Then processing logic waits for the next packet to arrive (processing block 129).

Referring to FIG. 1B, if the packet is not out of order, processing logic performs pattern matching on the packet from the last stored state of the pattern matching (processing block 130). In some embodiments, processing logic performs pattern matching using a deterministic finite automaton (DFA) for each predetermined pattern. An example of a pattern matching using a DFA is described below with reference to FIGS. 2A and/or 2B. Furthermore, processing logic may have been set up to perform multiple pattern matching in order to scan for a signature. To perform multiple pattern matching, processing logic may use a logical pointer to point at the pattern that is currently being matched.

Referring back to FIG. 1B, processing logic then determines whether the in order packets received so far match a predetermined attack pattern (i.e., a data pattern or a signature) (processing block 135). If there is a match, processing logic blocks the packet (processing block 137) and issues an alarm (processing block 139). If there is no match, processing logic checks whether there is any buffered packets in the IPS (processing block 140). If there is no buffered packets in the IPS, then processing logic updates and stores the current state of the pattern matching performed so far (processing block 152). Then processing logic transitions to processing block 127.

If there is at least one buffered packet in the IPS, then processing logic checks whether the buffered packet is next in order (processing block 142). Processing logic may check the sequence number in the buffered packet to determine whether the buffered packet is next in order. If the buffered packet is not next in order, then processing logic checks whether there is another buffered packet in the IPS (processing block 150). If there is no more buffered packet in the IPS, then processing logic transitions to processing block 152. Otherwise, processing logic returns to processing block 142 to check whether the other buffered packet is next in order.

If the buffered packet is next in order, processing logic transitions from processing block 142 to processing block 144 to perform pattern matching on the buffered packet. Then processing logic determines whether the packets compared so far contain a pattern matching the predetermined attack pattern (processing block 146). If there is a match, processing logic transitions to processing block 137 to block the packet. Processing logic then issues an alarm (processing block 139).

If there is no match, then processing logic clears this buffered packet from the buffer (processing block 148). Then processing logic transitions to processing block 150 to check whether there is any more buffered packet. If there is at least one more buffered packet, then processing logic repeats processing blocks 142. Otherwise, processing logic updates and stores the current state of the pattern matching (processing block 152) and then allows the current packet to pass (processing block 127). Processing logic waits for the next packet (processing block 129) before repeating the above process for the next packet.

By holding back the last packet received until it is verified that all the in order packets received so far do not contain the predetermined pattern, processing logic may prevent harmful or hostile data patterns from passing through the IPS via multiple out-of-order packets. The packets containing the incomplete hostile data pattern that have been passed to an application layer cannot launch an attack on the system. Moreover, by copying the out-of-order packets and allowing these out-of-order packets to pass, processing logic does not intrude or interrupt the data traffic, and hence, provides protection against attacks reduces the overall latency in data traffic due to the IPS.

Exemplary Reassembly-Free Data Stream Analysis

Figure 2A:
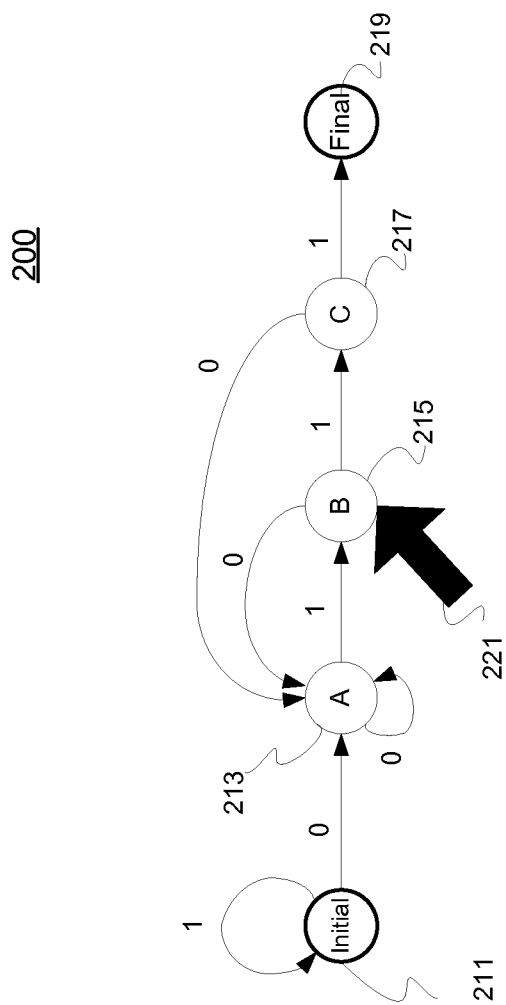
FIGS. 2A and 2B are state diagrams illustrating an exemplary DFA according to certain embodiments of the invention.

FIG. 2A is a state diagram illustrating an exemplary DFA according to one embodiment of the invention. In this example, an IPS is programmed to detect and to prevent a pattern of "0111" to pass through. The DFA 200 shown in FIG. 2A corresponds to this pattern. Processing logic may use the DFA 200 to perform pattern matching on a number of packets to determine whether the packets contain the pattern "0111". Furthermore, to simplify the illustration, it is assumed in this example that each packet contains only one digit. However, it should be appreciated that the concept is applicable to scenarios where a packet contains more than one digits and/or alphabetic letters.

Referring to FIG. 2A, the DFA 200 includes 5 states 211-219. The states 211-219 in the DFA 200 may be referred to as nodes. Pattern matching begins at the initial state 211. If a packet received contains a "1", processing logic remains in the initial state 211. If the packet contains a "0", which corresponds to the first digit in the predetermined pattern, processing logic transitions to the A state 213.

If processing logic receives a "0" subsequently, processing logic remains in the A state 213. If processing logic receives a "1", which corresponds to the second digit in the predetermined pattern, then processing logic transitions into the B state 215.

From the B state 215, processing logic may transition back to the A state 213 if the next packet received contains a "0". If the next packet received contains a "1", which corresponds to the third digit in the predetermined pattern, then processing logic transitions to the C state 217.

From the C state 217, processing logic may transition back to the A state 213 if the next packet received contains a "0". If the next packet received contains a "1", which corresponds to the last digit in the predetermined pattern, then processing logic transitions to the final state 219. When processing logic reaches the final state 219, processing logic knows that the packets received so far contains the predetermined pattern. Hence, processing logic may perform the appropriate operations in response to receiving the predetermined pattern, such as block the packet of the predetermined pattern last received and issuing an alarm to alert system administrators. To keep track of which state of the DFA processing logic is in, processing logic may use a logical pointer to point to the current state of the DFA. For example, a logical pointer 221 in FIG. 2A points at state B 215 to indicate that state B 215 is the current state of the pattern matching.

One advantage of using the DFA to perform pattern matching on packets is to eliminate the need to reassemble the packets because processing logic can walk through the DFA as each packet is received and examined. If processing logic reaches a final state, there is a match between the pattern contained in the packets received so far and the predetermined pattern. As mentioned above, a pattern is typically broken up into a number of segments and each segment is transmitted using a packet. Using the DFA, processing logic may not have to reassemble the packets in order to find out what the pattern contained in the packets is in order to match the pattern against a predetermined pattern. Processing logic may perform pattern matching on a packet-by-packet basis as each of the packets is received without reassembling the packets. Therefore, processing logic does not have to store the packets for reassembling the packets. Instead, processing logic may simply store a pointer to keep track of the current state in the DFA.

The concept described above may be expanded to signature detection. A signature is a collection of multiple patterns. To keep track of which pattern within a signature is being matched, processing logic may use a tree structure, where each node within the tree structure corresponds to a pattern and each pattern is represented using a DFA. Alternatively, a single DFA may represent multiple patterns, an example of which is discussed below with reference to FIG. 2B. Processing logic may use a pointer to point at the node corresponding to the pattern that is currently being matched.

In some embodiments, multiple patterns in a signature are matched sequentially. That is, once a first pattern is matched, processing logic goes on to try to match a second pattern. However, processing logic may continue looking for the first pattern in the incoming data packets because the first pattern may repeat before the second pattern arrives. In some embodiments, processing logic has to take into consideration of additional rules besides matching individual patterns of a signature. For example, a first pattern may have to be at least x bytes away from the second pattern, where x is a predetermined number. Alternatively, two patterns of the signature may have to be separated from each other by y bytes or less, where y is a predetermined number.

Figure 2B:
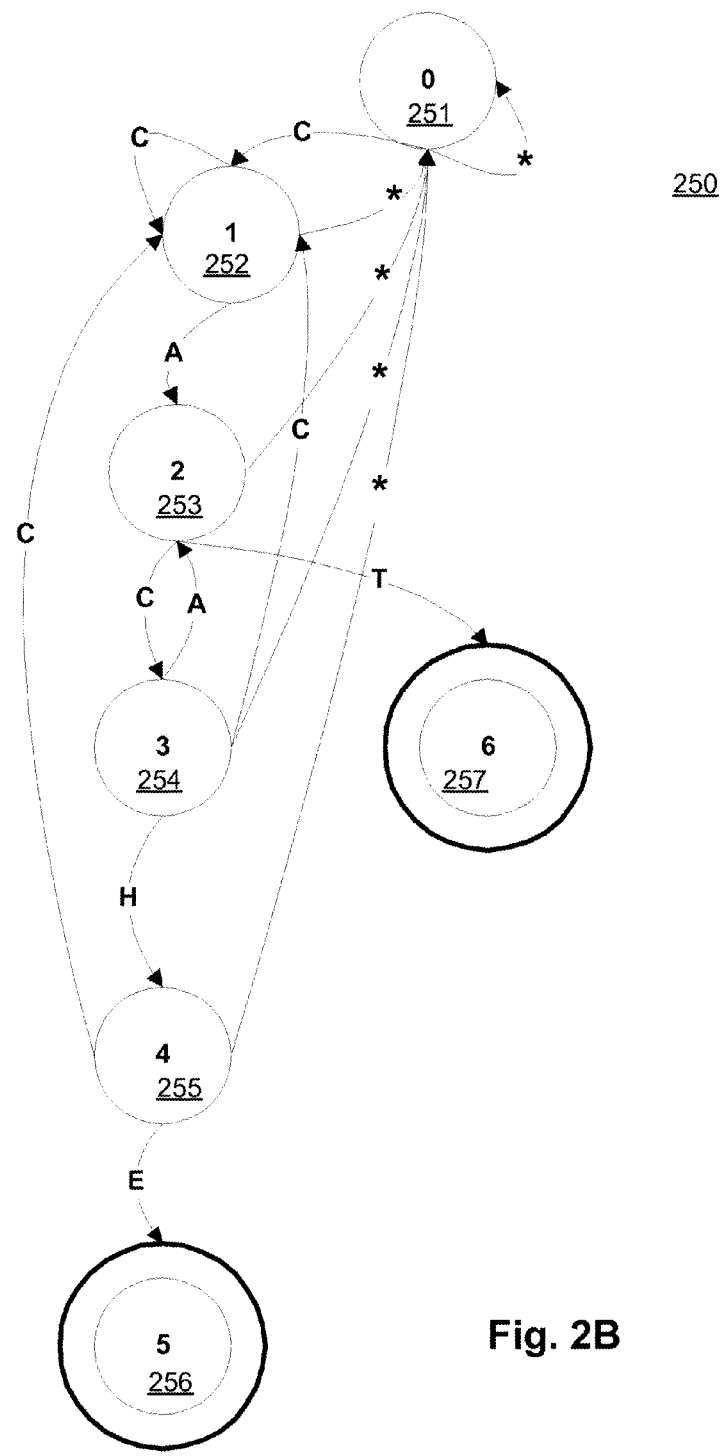

FIG. 2B is a state diagram illustrating an exemplary DFA according to an alternative embodiment of the invention. In this example, an IPS is programmed to detect a pattern of "CAT" and a pattern of "CACHE." Both patterns may be part of a signature. To simplify the illustration, it is assumed in this example that each packet contains only one alphabetic letter. However, it should be appreciated that the concept is applicable to scenarios where a packet contains one or more alphabetic letters and/or one or more numeric digits.

The DFA 250 includes six states 251-257. Pattern matching begins at the initial state 251. If a packet received contains a "C," which is the first letter of both "CAT" and "CACHE," processing logic transitions to the state 252. If the packet received contains any other alphabet, processing logic remains in the initial state 251. From state 252, if processing logic receives a "C," then processing logic remains in state 252. If processing logic receives an "A," then processing logic transitions to state 253. If processing logic receives any alphabet other than "A" or "C," processing logic returns to the initial state 251.

From state 253, if processing logic receives a "C," then processing logic transitions to state 254 because "C" is the third letter in the pattern "CACHE." If processing logic receives a "T," then processing logic transitions to the final state 257 because the pattern "CAT" is matched. If processing logic receives any alphabet other than "T" or "C," processing logic returns to the initial state 251.

From state 254, if processing logic receives a "C," then processing logic transitions back to state 253. If processing logic receives an "H," then processing logic transitions to state 255. If processing logic receives any alphabet other than "H" or "C," processing logic returns to the initial state 251.

From state 255, if processing logic receives a "C," then processing logic transitions back to state 252. If processing logic receives an "E," then processing logic transitions to the final state 256 because the pattern matches "CACHE." If processing logic receives any alphabet other than "E" or "C," processing logic returns to the initial state 251.

As discussed above, when processing logic reaches a final state (e.g., state 256 and state 257), processing logic knows that the packets received so far contains at least one of the predetermined patterns. Hence, processing logic may perform the appropriate operations in response to receiving the predetermined pattern, such as blocking the packet of the predetermined pattern last received and issuing an alarm to alert system administrators.

Furthermore, to keep track of which state of the DFA 250 processing logic is in, processing logic may use a logical pointer to point to the current state of the DFA 250. An example of the logical pointer has been discussed above with reference to FIG. 2A.

Figure 3:
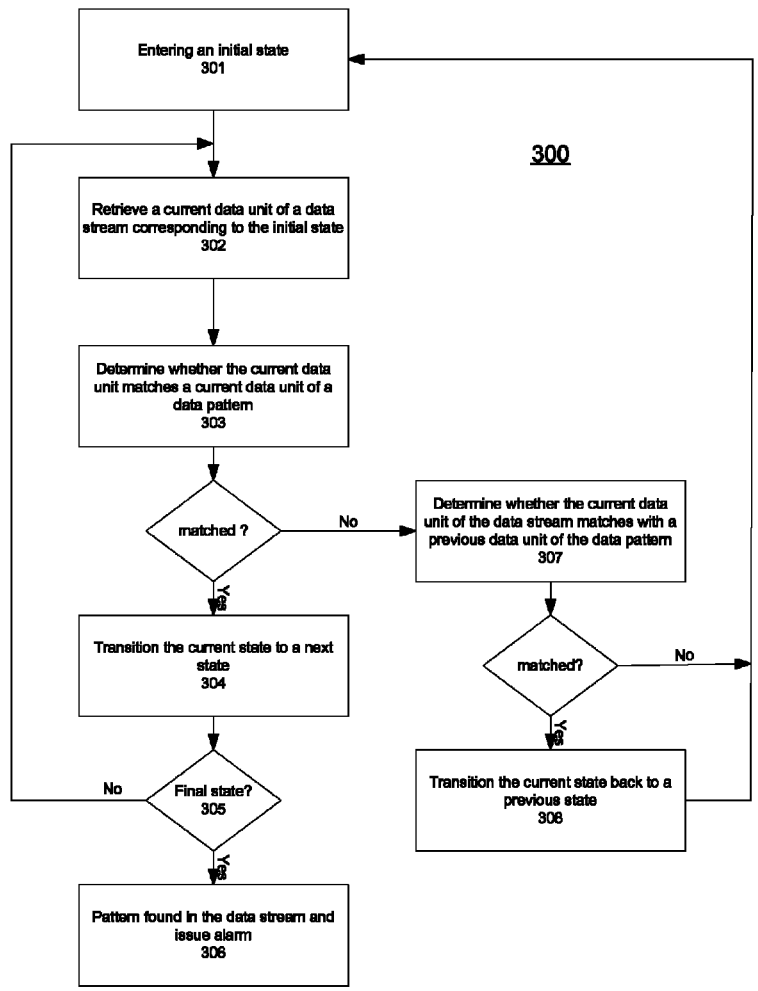
FIG. 3 is a flow diagram illustrating an exemplary process for data pattern analysis according to one embodiment of the invention.

FIG. 3 is a flow diagram illustrating an exemplary process for data pattern analysis according to one embodiment of the invention. Exemplary process 300 may be performed by processing logic processing logic that may include hardware (e.g., circuitry, dedicated logic, etc.), software (such as is run on a general-purpose computer system, a server, a router, or a dedicated machine), or a combination of both. Referring FIG. 3, according to one embodiment, the process starts with an initial state at block 301. At block 302, the processing logic retrieves a current data unit (e.g., a byte, word, etc.) of a data stream corresponding to the initial state. At block 303, the processing logic determines whether the current data unit matches a current data unit of a predetermined data pattern. If so, the current state is transitioned to a next state at block 304. At block 305, it is determined whether the new state (e.g., next state) is a final state. If the new state is not a final state, the above operations may be repeated for subsequent data units. If the new state is a final state, at block 306, the predetermined data pattern has been found and an alarm may be issued.

If the current data unit of the data stream does not match with the current data unit of the predetermined data pattern at block 303, it is determined whether the current data unit of the data stream matches with a previous data unit of the data pattern at block 307. If so, the current state is transitioned back to a previous state at block 308. Otherwise, the current state is transitioned back to the initial state at block 301. Other operations may also be performed.

Exemplary Network Access Devices

Figure 4:
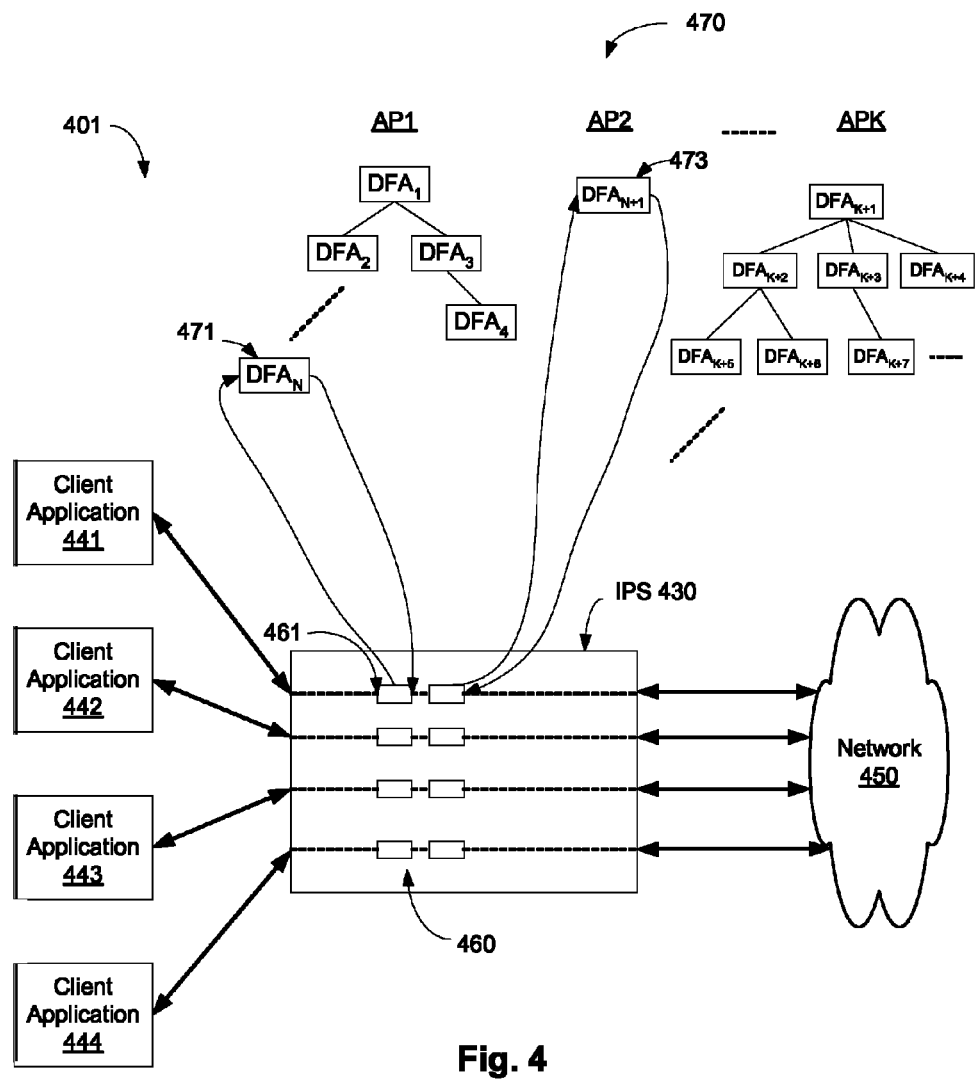
FIG. 4 is a block diagram illustrating an exemplary system for data pattern analysis according to one embodiment of the invention.

FIG. 4 is a block diagram illustrating an exemplary system for data pattern analysis according to one embodiment of the invention. The system 401 includes a network 450, an IPS 430, and a number of client applications 441-444. The client applications 441-444 may run on different client machines (e.g., a personal computer, a workstation, etc.) or two or more of the client applications 441-444 may run on a single client machine. Furthermore, the IPS 430 may run on one of the client machines or on a separate unit, such as a server, a router, or a switch.

In some embodiments, data packets 460 (e.g., TCP packets) are transmitted via the IPS 430 between the network 450 and the client applications 441-444. In order to detect multiple signatures in the packets passing through the IPS 430, the IPS 430 keeps track of which signature(s) is being matched for which TCP connection and which pattern within the corresponding signature is being matched. Referring to FIG. 4, the IPS 430 is programmed to detect a number of attack patterns 470, such as AP1, AP2, APK, etc. Each of the attack patterns 470 may include one or more predetermined patterns. An attack pattern that includes multiple patterns (e.g., AP1, APK) may also be referred to as a signature. AP1 includes n patterns represented by $DFA_1$ to $DFA_N$ respectively. Upon a successful match of $DFA_1$ of AP1 for a given client application, $DFA_2$ of AP1 is started for that client application. Upon completing $DFA_N$ for AP1, an attack pattern is identified. Unlike AP1, AP2 includes a single pattern presented by $DFA_{n+1}$. APK includes multiple patterns represented by $DFA_k$, $DFA_{k+1}$, etc. Note that the multiple patterns of an attack pattern may be represented by a tree structure, where each node of the tree structure corresponds to a pattern of the signature.

The IPS 430 may perform pattern matching on the packets 460 received. For example, consider the packet 461, which is destined to the client application 441. The IPS 430 performs pattern matching on the packet 461 to determine whether the packet 461 and the other packets received so far contain data matching the predetermined pattern corresponding to the $DFA_n$ 471. The IPS 430 may store a logical pointer 481 pointing at the $DFA_n$ 471 of Signature1 after performing pattern matching on the packet 461. In addition, processing logic may store another pointer to point at the current state in the corresponding DFA, i.e., $DFA_n$ 471, as described above with reference to FIG. 2A. This state tracking may be bidirectional (i.e., states may be kept on traffic in both directions between client applications 441-444 and the network 450).

The techniques discussed above may be implemented in various embodiments of a networked system. One exemplary embodiment is discussed below to illustrate the concept. However, one should appreciate that the invention is not limited to the configurations in the following embodiment. For example, the IPS 430 may run on a dedicated machine or on different devices within the system, such as a router, a switch, a server, etc.

Figure 5:
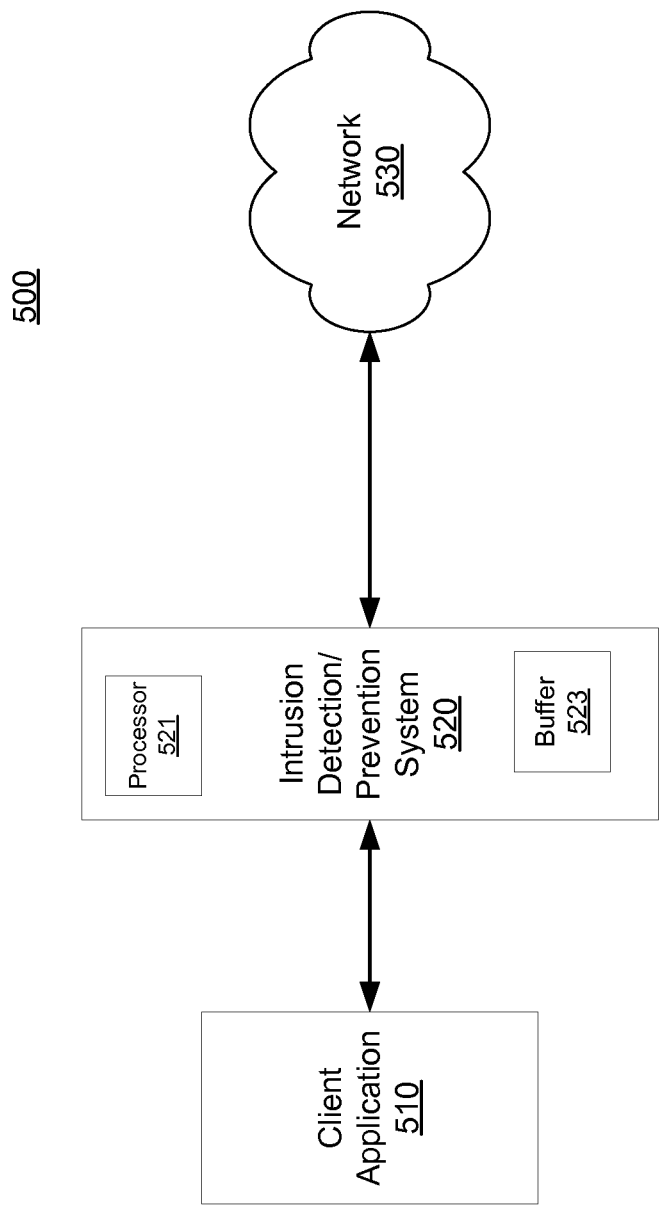
FIG. 5 is a block diagram illustrating an exemplary system for data pattern analysis according to another embodiment of the invention.

FIG. 5 is a block diagram illustrating an exemplary system for data pattern analysis according to another embodiment of the invention. The system 500 includes at least one client application 510, an IPS 520, and a network 530. The client application 510 is communicatively coupled to the IPS 520. The IPS 520 is communicatively coupled to the network 530. Data is transmitted between the network 530 and the client application 510 via the IPS 520 in packets. In one embodiment, the IPS includes a processor 521 and a buffer 523.

Note that any or all of the components and the associated hardware/software illustrated in FIG. 5 may be used in various embodiments of the system 500. However, it should be appreciated that other configurations of the system 500 may include more or less devices than those shown in FIG. 5.

In some embodiments, the processor 521 of the IPS 520 determines whether a packet received is out of order. The processor 521 may examine a sequence number in the packet to determine whether the packet received is out of order. If the packet is out of order, the processor 521 may make a copy of the packet and temporarily store the copy in the buffer 523 before allowing the packet to pass through the IPS 520. If the packet is in order, the processor 521 may perform pattern matching on the packet to determine whether the packet and the other packets received so far contain one of a number of predetermined patterns. Some of these predetermined patterns may be part of a signature. In order to keep track of which pattern is being matched, the processor 521 may use a logical pointer to keep track of the pattern that is currently being matched.

In one embodiment, the processor 521 uses a corresponding DFA to perform pattern matching against one of the predetermined patterns. The DFA may include a number of states corresponding to different parts of the predetermined pattern. When the final state in the DFA is reached, the processor 521 knows that the packets received so far contains the predetermined pattern. The processor 521 may use a pointer to keep track of the current state of the DFA. In addition, the processor 521 may use another pointer to keep track of which one of the predetermined patterns the processor 521 is matching. Detail of one embodiment of the process to perform multiple packet payload analysis in the IPS 520 is described above with reference to FIGS. 1A and 1B.

Exemplary Reassembly-Free Data Pattern Analysis of a File

According certain embodiments of the inventions, the above described techniques may be applied to file scanning. In one embodiment, when a file is being downloaded, it is identified as a part of supported protocol and a reassembly free protocol state machine may determine the position of the beginning of the file inside of the protocol data stream. A context may be maintained throughout the entire connection in order to preserve the state associated with the protocol state machine. Thus, as each packet is being passed through the firewall, the context (e.g., state) associated with the state machine is being updated to reflect both the position of the protocol parsing and the state of the protocol parsing. Note that the order of the packets may be maintained using the techniques described above. As the start of download file became known, according to one embodiment, a separate virus-scanning pass is initiated, where the content of each packet is matched against the DFA that contains a predetermined data pattern (e.g., virus signature).

In many cases, files may be encoded and/or compressed. The encoding is necessary in many protocols that do not handle binary data. For example, SMTP (simple mail transport protocol), POP (post office protocol), and/or IMAP (Internet message access protocol) handle only ASCII (American Standard Code for Information Interchange) data, thus any file transfer of over these protocol has to convert binary files to ASCII via encoding, such as, for example, base64, UUENCODE, and/or BinHex encoding, which are relative popular encoding techniques for converting binary data to ASCII formats in email programs. Besides encoding, compression is another common tool for reducing the amount of traffic when sending files over the Internet. Often in email applications, files are compressed and then encoded in a variety of encoding techniques (e.g., base64 or other formats), as shown for example, in FIG. 7A. In one embodiment, a network access device, such as, for example, a gateway, a switch, and/or a modem, is capable of decoding and/or decompressing a file in order to perform the virus/malware scanning.

Once a file has been decoded and/or decompressed within a network access device, the network access device may perform virus scanning using at least one of the above-described techniques on a per-packet basis without having to wait for a remainder of the file to arrive.

As described above, a file associated with an email may be typically encoded with base64 compatible encoding techniques and/or compressed with LZ77 compatible compression techniques. According to one embodiment, a network access device is capable of performing base64 decoding and LZ77 decompression on a file stream passing through the network access device without reassembling the file within the network access device (e.g., on a packet-per-packet basis), prior to performing reassembly-free data pattern analysis using at least one of the above described techniques.

Base64 encoding is an approach to convert each 3 bytes of a binary or text file into 4 bytes selected from the well-known base64 alphabets. In order to decode such encoding formats without reassembly, according to one embodiment, a per-connection state of base64 decoding progress is needed. According to a particular embodiment, the approach is to decode as much as possible on a 4-byte boundary for each packet and buffer up the remainder while ignoring characters outside of base64 alphabets. According to one embodiment, as a packet (containing a segment of a file) arrives, a buffered base64 encoding input, if any, is pre-pended to the packet and the result may become a new input which needs to be base64 decoded. Note that it is assumed that the ordering of the arriving packets (e.g., TCP packets) has been maintained using at least one of the techniques described above.

According to one embodiment, reassembly-free decompression is supported for a deflate algorithm which may be a part of ZIP or GZIP compressed file formats. According to one embodiment, each of the file formats described above may be identified by a unique signature in a file header. The protocol state machines identify the file header and attempt to match the unique signature of the file header. If they are matched, the entire file header may be buffered until the end of the header. Then the decoding of the compressed blocks starts. A compressed file or files which use a LZ77 compatible "deflate" algorithm may include multiple compressed blocks.

Each compressed block may include an information part for describing the respective block, a dictionary that may be represented via a Huffman code tree, and the actual encoded/compressed part. In addition, a predetermined window (e.g., a 32-Kbyte window) may be maintained to represent a possible dictionary for the last certain bytes (e.g., 32 Kbytes) processed. Thus, some compressed blocks may have a respective dictionary completely absent and they may rely on referencing the predetermined window. A main property of an LZ77 based compression algorithm, which allows a reassembly-free decompression to be performed, is the fact that there is no single dictionary for the entire file. Rather, there are multiple dictionaries for multiple blocks within a file and that a dictionary (represented as Huffman code tree) comes before the encoded part inside of the compressed block.

Using the "deflate" compression algorithm properties described above, according to one embodiment, it is possible to decompress a file on a per packet basis as long as each packet is processed in order, which may be maintained using at least one of the techniques described above. As TCP packets arrive in order, according to one embodiment, each compressed block is examined after the file header is parsed (to determine the encoding and/or compression methods). Since a dictionary represented as a Huffman code tree is typically located before the actual compressed portion of the respective block, it is possible to dynamically build the Huffman code tree for each block. Once the compressed portion of the block shows up, it can be decompressed using the most recently built Huffman code tree and constantly updated the predetermined dictionary window (e.g., 32-Kbyte window). The process may continue for each compressed block by dynamically generating and destroying dictionaries represented as Huffman code trees until the end of the compressed file.

Figure 6:
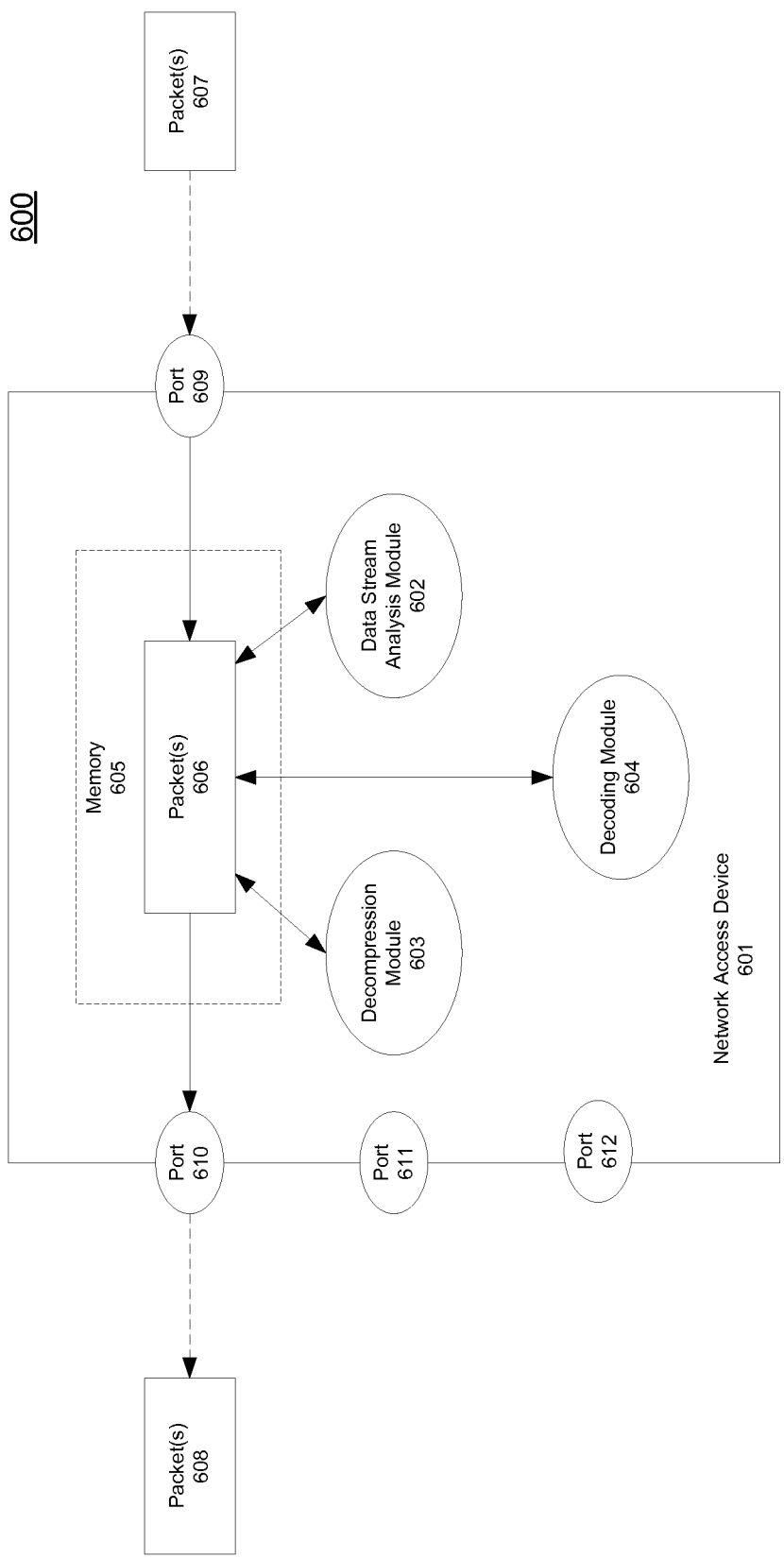
FIG. 6 is a block diagram illustrating an exemplary system according to one embodiment of the invention.

FIG. 6 is a block diagram illustrating an exemplary system according to one embodiment of the invention. For example, exemplary system 600 may include a network access device implemented as a gateway device, a network hub device, and/or a switch device. In one embodiment, exemplary network access device includes, but is not limited to, an interface to receive a data packet of a data stream containing a file segment of a file originated from an external host and destined to a protected host of a local area network (LAN), the file being transmitted via multiple file segments contained in multiple data packets of the data stream, and a data analysis module coupled to the interface to perform a data pattern analysis on the received data packet to determine whether the received data packet contains a predetermined data pattern, without waiting for a remainder of the data stream to arrive.

Referring to FIG. 6, exemplary system 600 includes a network access device 601 having an uplink port 609 (also referred to as an outbound port) coupled to first network (e.g., an external network such as a wide area network or Internet) to receive packets 607 and one or more downlink ports 610-612 (also referred to as inbound ports) coupled to a second network (e.g., a local area network or LAN) to distribute packets 608 to one or more hosts of the LAN. For the purposes of illustrations, it is assumed that the packets 607 are originated from an external host of an external network and destined to a protected host of a LAN.

In one embodiment, the exemplary network access device 601 further includes a data stream analysis module 602, a decompression module 603, and a decoding module 604. The data stream analysis module 602 may be used to perform a data pattern matching on a packet-per-packet basis. That is, when the network access device 601 receives a packet 606, the data stream analysis module 602 may perform a data pattern matching on packet 606 without having to wait for other packets, such as packets 607, to arrive. The data stream analysis module 602 may perform the data pattern matching using a reassembly-free data pattern matching technique described above.

According to one embodiment, the network access device 601 further includes a memory 605 to temporarily store the received packet 606. The memory 605 may also be used to store the predetermined data patterns to be matched, as well as the DFAs representing the predetermined data patterns. The memory 605 may also be used to buffer multiple data packets if they are out of order and to allow the out-of-order packets to be put in order, using at least one of the above techniques.

Figure 7A:
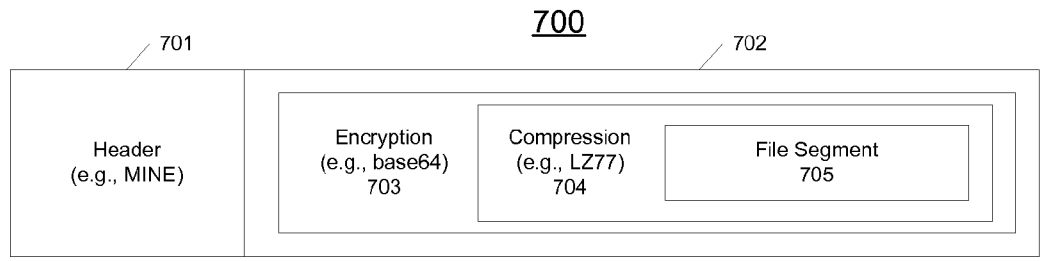
FIGS. 7A-7D are diagrams illustrating an exemplary data packet.

The packet 606 may include a segment of a file and the segment of file may be encoded and/or compressed, using a variety of encoding techniques (e.g., base64) and compression techniques (e.g., LZ77), similar to packet 700 as shown in FIG. 7A. According to one embodiment, prior to performing the data pattern matching, the network access device 601 may examine the packet 606, for example, by examining a header of the packet 606, to determine whether the packet 606 is encoded and/or compressed. If so, the encoding and compression methods may also be determined. The above operations may be performed by the data stream analysis module 602, decompression module 603, decoding module 604, or a combination of at least two of the modules 602-604.

Referring to FIGS. 6 and 7A-7D, when the network access device 601 receives packet 700 having a header 701 and a payload 702. The payload 702 may include a file segment 705 optionally compressed using a compression method 704 and optionally encoded using an encoding method 703. The header 701 is then examined to determine whether the packet is encoded and/or compressed. If the file segment 705 is not encoded or compressed, the payload 702 only contains the plain file segment 705. In this situation, the data stream analysis module 602 may immediately perform data pattern matching on the file segment 705 using a reassembly-free data pattern matching techniques described above.

Figure 7B:
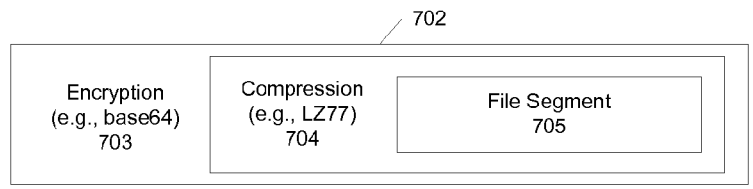
Figure 7C:
Figure 7D:

If the file segment 705 is encoded as shown in FIG. 7B, the decoding module 604 may be invoked to decode the payload 702 using a decoding method corresponding to the encoding method specified by the encoding header 703, as shown in FIG. 7C. Similarly, if the file segment 705 is compressed, the decompression module 603 may be invoked to decompress the file segment 705 using a decompression method corresponding to the compression method specified by the compression header 704. As a result of the decompression operation, one or more file blocks 706-708 are generated as shown in FIG. 7D. Thereafter, the data stream analysis module 602 is used to perform the data pattern analysis. Other configurations may exist.

Figure 8:
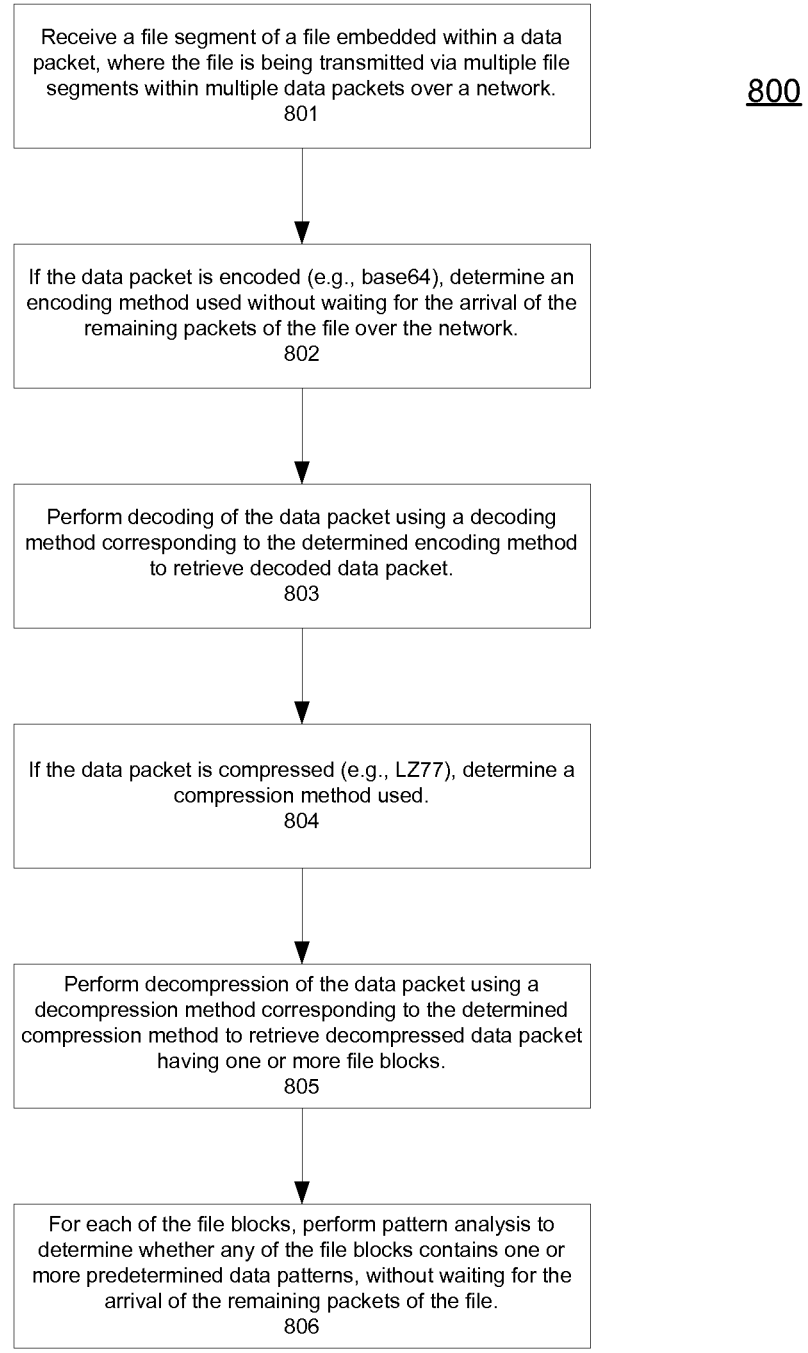
FIG. 8 is a flow diagram illustrating an exemplary process for performing a data pattern analysis on a file according to one embodiment.

FIG. 8 is a flow diagram illustrating an exemplary process for performing a data pattern analysis on a file according to one embodiment. The exemplary process 800 may be performed by processing logic that may include hardware (e.g., circuitry, dedicated logic, etc.), software (such as is run on a general-purpose computer system, a server, a router, or a dedicated machine), or a combination of both. For example, exemplary process 800 may be performed by network access device 601 of FIG. 6.

In one embodiment, the exemplary process 800 includes, but is not limited to, receiving a data packet of a data stream containing a file segment of a file originated from an external host and destined to a protected host of a local area network (LAN), the file being transmitted via multiple file segments contained in multiple data packets of the data stream, and performing a data pattern analysis on the received data packet to determine whether the received data packet contains a predetermined data pattern, without waiting for a remainder of the data stream to arrive.

Referring to FIG. 8, at block 801, the processing logic receives a file segment of a file embedded within a data packet, while a remainder of the file is being transmitted via multiple file segments within multiple data packets over a network. Without waiting for the remainder of the file to arrive, at block 802, the processing logic determines whether the file segment is encoded, for example, by examining a packet header. If the file segment is encoded, the processing logic determines the encoding technique used in encoding the file segment and at block 803, the processing logic decodes the packet using a decoding method corresponding to the determined encoding method.

At block 804, the processing logic further determines whether the file segment is compressed and if so, the compression techniques used, for example, by examining the packet header. At block 805, the processing logic decompresses the data packet using a decompression method corresponding to the determined compression method, resulting in one or more file blocks. At block 806, a data pattern analysis is performed on the one or more file blocks. Note that, the decoding and/or decompression operations above are optional. They are performed only if the file segment is encoded and/or compressed. Other operations may also be performed.

Exemplary Network Configurations

Figure 9:
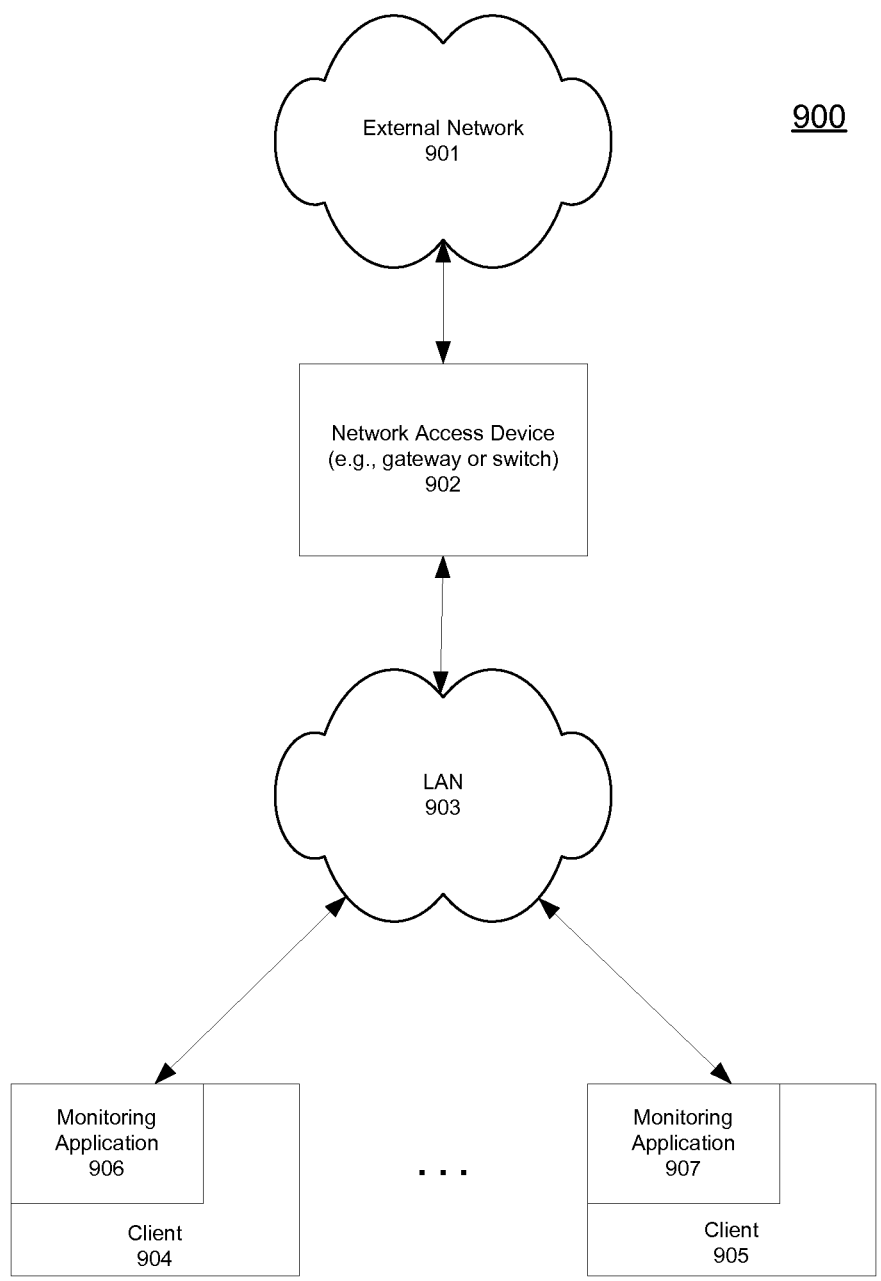
FIG. 9 is a block diagram illustrating an exemplary network configuration according to one embodiment.

FIG. 9 is a block diagram illustrating an exemplary network configuration according to one embodiment. Referring to FIG. 9, in one embodiment, the exemplary configuration 900 includes a network access device 902 providing network access services for one or more clients 904-905 over a local area network 903. In order to access a remote facility over an external network 901, each of the clients 904-905 has to go through the network access device 902 and optionally, a network service provider (e.g., an Internet service provider).

In one embodiment, the connection between the network access device 902 and the external network 901 may be a wired connection. Alternatively, such a connection may be a wireless connection; for example, a satellite or an IEEE 802.16 connection. The external network 901 may be a wide area network (WAN), such as, for example, the Internet. The LAN 903 may be a home network using an IEEE 802.1x compatible protocol. Alternatively, the LAN 903 may be a local network within an organization (e.g., an Intranet). The LAN 903 may be a wired or wireless network, or a combination of both, using a variety of network protocols, such as, Ethernet and/or IEEE 802.xx compatible protocols, such as, for example, Wi-Fi and/or Bluetooth protocols. Wireless connections may include both RF and non-RF links, for example, an IR link. Wired connections may include both electrical and non-electrical links, for example, fiber optic links.

According to one embodiment, each of the clients 904-905, also referred to as protected hosts, may include a monitoring application 906-907 respectively. The monitoring application of a protected host periodically or constantly communicates with the network access device 902 over the LAN 903. When the network access device 902 receives a packet of a data stream containing multiple packets, the network access device 902 may decode, decompress, and/or perform data pattern matching on a packet-per-packet basis without having to wait for the rest of the packets to arrive, using at least one of the techniques described above.

When a predetermined data pattern is found in one or more data packets of the data stream, the network access device may block the data packets as well as the remaining data packets that are about to arrive. Thereafter, according to one embodiment, the network access device 902 may notify the corresponding protected host that is receiving the data stream that a predetermined data pattern has been found in the data stream, which indicates a virus may exist in the data stream. The notification is received by the corresponding monitoring application (e.g., monitoring applications 906-907) of the protected host. The protected host may discard the packets that have already been received in response to the notification. Alternatively, the monitoring application of the protected host may periodically pull the network access device 902 to query the status of the data stream. Other configurations may exist.

Figure 10:
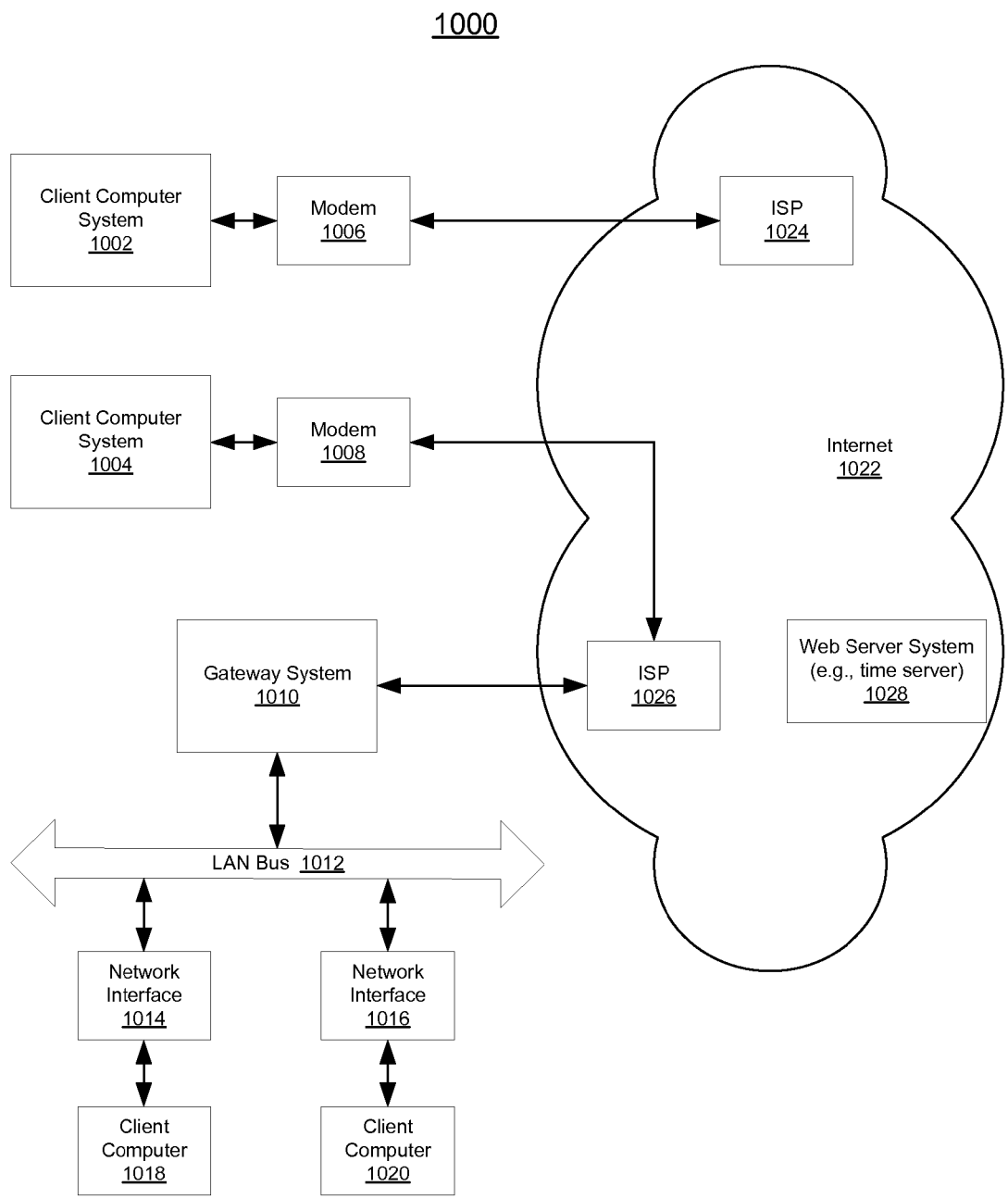
FIG. 10 is a diagram of a network of computer systems, which may be used with an embodiment of the invention.

FIG. 10 is a diagram of a network of computer systems, which may be used with an embodiment of the invention. As shown in FIG. 10, a network 1000 includes a number of client computer systems that are coupled together through an Internet 1022. It will be appreciated that the term "Internet" refers to a network of networks. Such networks may use a variety of protocols for exchange of information, such as TCP/IP, ATM, SNA, SDI. The physical connections of the Internet and the protocols and communication procedures of the Internet are well known to those in the art. It will be also appreciated that such systems may be implemented in an Intranet within an organization.

Access to the Internet 1022 is typically provided by Internet service providers (ISPs), such as the ISP 1024, and the ISP 1026. Users on client systems, such as the client computer systems 1002, 1004, 1018, and 1020, generally obtain access to the Internet through Internet service providers, such as ISPs 1024 and 1026. Access to the Internet may facilitate transfer of information (e.g., email, text files, media files, etc.) between two or more digital processing systems, such as the client computer systems 1002, 1004, 1018, and 1020 and/or a Web server system 1028.

For example, one or more of the client computer systems 1002, 1004, 1018, and 1020 and/or the Web server 1028 may provide document presentations (e.g., a Web page) to another one or more of the client computer systems 1002, 1004, 1018, and 1020 and/or Web server 1028. For example, in one embodiment of the invention, one or more client computer systems 1002, 1004, 1018, and 1020 may request to access a document that may be stored at a remote location, such as the Web server 1028. In the case of remote storage, the data may be transferred as a file (e.g., download) and then displayed (e.g., in a window of a browser) after transferring the file. In another embodiment, the document presentation may be stored locally at the client computer systems 1002, 1004, 1018, and/or 1020. In the case of local storage, the client system may retrieve and display the document via an application, such as a word processing application, without requiring a network connection.

The Web server 1028 typically includes at least one computer system to operate with one or more data communication protocols, such as the protocols of the World Wide Web and, as such, is typically coupled to the Internet 1022. Optionally, the Web server 1028 may be part of an ISP which may provide access to the Internet and/or other network(s) for client computer systems. The client computer systems 1002, 1004, 1018, and 1020 may each, with appropriate Web browsing software, access data, such as HTML document (e.g., Web pages), which may be provided by the Web server 1028.

The ISP 1024 provides Internet connectivity to the client computer system 1002 via a modem interface 1006, which may be considered as part of the client computer system 1002. The client computer systems 1002, 1004, 1018, and 1020 may be a conventional data processing system, such as a Power Mac G5 or iMac computer available from Apple Computer, Inc., a "network" computer, a handheld/portable computer, a cell phone with data processing capabilities, a Web TV system, or other types of digital processing systems (e.g., a personal digital assistant (PDA)).

Similarly, the ISP 1026 provides Internet connectivity for the client computer systems 1002, 1004, 1018, and 1020. However, as depicted in FIG. 10, such connectivity may vary between various client computer systems, such as the client computer systems 1002, 1004, 1018, and 1020. For example, as shown in FIG. 10, the client computer system 1004 is coupled to the ISP 1026 through a modem interface 1008, while the client computer systems 1018 and 1020 are part of a local area network (LAN). The interfaces 1006 and 1008, shown as modems 1006 and 1008, respectively, may represent an analog modem, an ISDN modem, a DSL modem, a cable modem, a wireless interface, or other interface for coupling a digital processing system, such as a client computer system, to another digital processing system.

The client computer systems 1018 and 1020 are coupled to a LAN bus 1012 through network interfaces 1014 and 1016, respectively. The network interface 1014 and 1016 may be an Ethernet-type, asynchronous transfer mode (ATM), or other type of network interface. The LAN bus is also coupled to a gateway digital processing system 1010, which may provide firewall and other Internet-related services for a LAN. The gateway digital processing system 1010, in turn, is coupled to the ISP 1026 to provide Internet connectivity to the client computer systems 1018 and 1020. The gateway digital processing system 1010 may, for example, include a conventional server computer system. Similarly, the Web server 1028 may, for example, include a conventional server computer system.

In one embodiment, the local area network 1012 may be local wireless network (e.g., a home network) and the gateway 1010 may include a wireless access point (also referred to as a base station) to one or more clients 1018 and 1020 using a variety of wireless networking protocols; for example, the IEEE 802.xx protocols including Wi-Fi and/or Bluetooth protocols. In a further embodiment, the gateway 1010 may access the server 1028 via dialup network services using a modem.

According to one embodiment, the data pattern matching techniques, decoding, and decompression techniques described above may be implemented with any of the network access devices, such as, modems 1006 and 1008, and/or gateway 1010.

Exemplary Data Processing System

Figure 11:
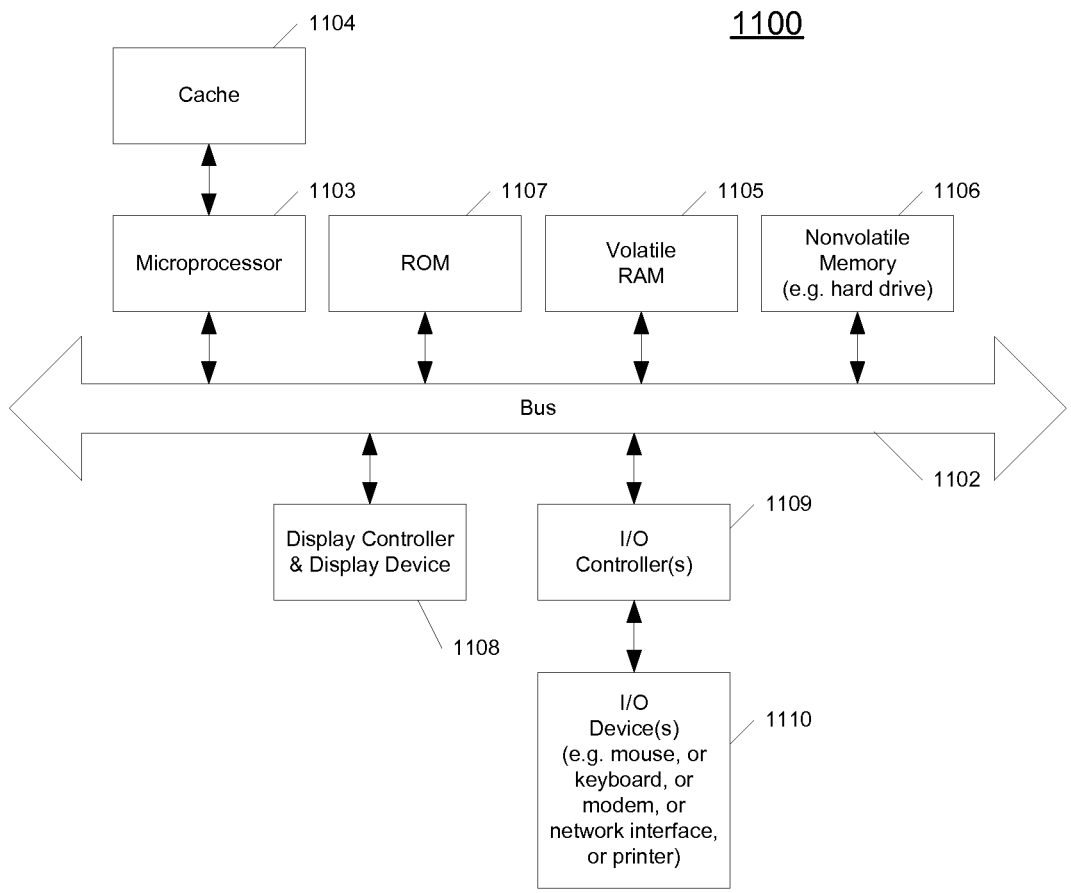
FIG. 11 is a block diagram of a digital processing system which may be used with one embodiment of the invention.

FIG. 11 is a block diagram of a digital processing system which may be used with one embodiment of the invention. For example, the system 1100 shown in FIG. 11 may be used as a client computer system such as a protected host. Alternatively, the exemplary system 1100 may be implemented as a network access device described above and/or a wireless access point.

Note, that while FIG. 11 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 11 may, for example, be an Apple Macintosh computer or an IBM compatible PC.

As shown in FIG. 11, the computer system 1100, which is a form of a data processing system, includes a bus 1102 which is coupled to a microprocessor 1103 and a ROM 11011, a volatile RAM 1105, and a non-volatile memory 1106. The microprocessor 1103, which may be, for example, a PowerPC G4 or PowerPC G5 microprocessor from Motorola, Inc. or IBM, is coupled to cache memory 1104 as shown in the example of FIG. 11. The bus 1102 interconnects these various components together and also interconnects these components 1103, 11011, 1105, and 1106 to a display controller and display device 1108, as well as to input/output (110) devices 1110, which may be mice, keyboards, modems, network interfaces, printers, and other devices which are well-known in the art.

Typically, the input/output devices 1110 are coupled to the system through input/output controllers 1109. The volatile RAM 1105 is typically implemented as dynamic RAM (DRAM) which requires power continuously in order to refresh or maintain the data in the memory. The non-volatile memory 1106 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 11 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1102 may include one or more buses connected to each other through various bridges, controllers, and/or adapters, as is well-known in the art. In one embodiment, the 1/0 controller 1109 includes a USB (Universal Serial Bus) adapter for controlling USB peripherals. Alternatively, 1/0 controller 1109 may include an IEEE-1394 adapter, also known as FireWire adapter, for controlling FireWire devices. Other components may also be included.

Thus, a method and apparatus for identifying data patterns of a file have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, the present invention is not described with reference to any particular programming language. It will be appreciated that a variety of programming languages may be used to implement the teachings of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for performing re-assembly free deep packet inspection, the method comprising:
   receiving a data stream over a communication network, the received data stream comprising a plurality of data packets ordered in a predetermined order;
   identifying that the plurality of data packets are not being received in the predetermined order, wherein at least one data packet is received before a precedent data packet in the predetermined order is received and is an out-of-order packet of a plurality of out-of-order data packets;
   storing the plurality of out-of-order data packets in a buffer, such that the buffer includes each of the out-of-order packets including the at least one data packet;
   transmitting each of the plurality of packets received out-of-order to a recipient except for the at least one data packet; and
   receiving a first set of other data packets of the data stream;
   identifying that the first set of other data packets and each of the data packets stored in the buffer can be scanned in order except for the at least one data packet;
   scanning in order each of the data packets stored in the buffer and the first set of other data packets except for the at least one data packet; and
   transmitting each of the each of the data packets stored in the buffer and the first set of other data packets to the recipient except for the at least one data packet, wherein the at least one data packet is prevented from being transmitted to the recipient until verification that previous scanned packets when combined with the at least one data packet do not contain an attack pattern.

2. The method of claim 1, further comprising:
   receiving a second set of data packets in the data stream;
   identifying at least one data packet from the second set of data packets is a subsequent packet to the at least one data packet;
   identifying that the second set of data packets and the at least one data packet can be scanned in order except for the at least one identified data packet from the second set of data packets;
   scanning the second set of other data packets and the at least one data packet except for the at least one identified packet from the second set of data packets; and
   transmitting the second set of data packets and the at least one data packet to the recipient except for the at least one identified packet from the second set of data packets, wherein the at least one identified data packet from the second set of data packets is prevented from being transmitted to the recipient until verification that other previously scanned packets when combined with the at least one identified data packet from the second set of data packets do not contain the attack pattern.

3. The method of claim 1, wherein the a state of pattern matching is stored after one or more data packets of the plurality of data packets of the data stream are scanned.

4. The method of claim 3, wherein each of the one or more data packets are decoded before they are scanned.

5. The method of claim 3, wherein each of the one or more data packets are decompressed before they are scanned.

6. The method of claim 3, wherein the state of pattern matching is tracked by a pointer that points to at least one state in a series of states where each of the states in the series of states from an initial state to an end state correspond to the attack pattern.

7. The method of claim 6, wherein the attack pattern is detected when a current state of pattern matching corresponds to an end state of a series of states corresponding to a previously identified pattern including at least one of a digit or at least one character.

8. A non-transitory computer readable storage medium having embodied thereon a program executable by a processor to perform a method for re-assembly free deep packet inspection, the method comprising:
    receiving a data stream over a communication network, the received data stream comprising a plurality of data packets ordered in a predetermined order;
    identifying that the plurality of data packets are not being received in the predetermined order, wherein at least one data packet is received before a precedent data packet in the predetermined order is received and is an out-of-order packet of a plurality of out-of-order data packets;
    storing the plurality of out-of-order data packets in a buffer, such that the buffer includes each of the out-of-order packets including the at least one data packet;
    transmitting each of the plurality of packets received out-of-order to a recipient except for the at least one data packet; and
    receiving a first set of other data packets of the data stream;
    identifying that the first set of other data packets and each of the data packets stored in the buffer can be scanned in order except for the at least one data packet;
    scanning in order each of the data packets stored in the buffer and the first set of other data packets except for the at least one data packet; and
    transmitting each of the each of the data packets stored in the buffer and the first set of other data packets to the recipient except for the at least one data packet, wherein the at least one data packet is prevented from being transmitted to the recipient until verification that previous scanned packets when combined with the at least one data packet do not contain an attack pattern.

9. The non-transitory computer readable storage medium of claim 8, further comprising instructions executable to:
    receive a second set of data packets in the data stream;
    identify at least one data packet from the second set of data packets is a subsequent packet to the at least one data packet;
    identify that the second set of data packets and the at least one data packet can be scanned in order except for the at least one identified data packet from the second set of data packets;
    scan the second set of data packets and the at least one data packet except for the at least one identified data packet from the second set of data packets; and
    transmit the second set of data packets and the at least one data packet to the recipient except for the at least one identified data packet from the second set of data packets, wherein the at least one identified data packet from the second set of data packets is prevented from being transmitted to the recipient until verification that other previously scanned packets when combined with the at least one identified data packet from the second set of data packets do not contain the attack pattern.

10. The non-transitory computer readable storage medium of claim 8, wherein the a state of pattern matching is stored after one or more data packets of the plurality of data packets of the data stream are scanned.

11. The non-transitory computer readable storage medium of claim 10, wherein each of the one or more data packets are decoded before they are scanned.

12. The non-transitory computer readable storage medium of claim 10, wherein each of the one or more data packets are decompressed before they are scanned.

13. The non-transitory computer readable storage medium of claim 10, wherein the state of pattern matching is tracked by a pointer that points to at least one state in a series of states where each of the states in the series of states from an initial state to an end state correspond to the attack pattern.

14. The non-transitory computer readable storage medium of claim 13, wherein the attack pattern is detected when a current state of pattern matching corresponds to an end state of a series of states corresponding to a previously identified pattern including at least one of a digit or at least one character.

15. An apparatus that performs re-assembly free deep packet inspection, the system comprising:
    a first network communication interface that receives a data stream, the received data stream comprising a plurality of data packets ordered in a predetermined order;
    a memory;
    a processor executing instructions out of the memory to:
        identify that the plurality of data packets are not being received in the predetermined order, wherein at least one data packet is received before a precedent data packet in the predetermined order is received and is an out-of-order packet of a plurality of out-of-order data packets, and
        store the plurality of out-of-order data packets in a buffer, such that the buffer includes each of the out-of-order packets including the at least one data packet; and
    a second network communication interface that transmits each of the plurality of packets received out-of-order to a recipient except for the at least one data packet, wherein:
        a first set of other data packets of the data stream are received over the first data communication interface,
        the processor executing the instructions out of the memory identifies that the first set of other data packets and each of the data packets stored in the buffer can be scanned in order except for the at least one data packet,
        the processor executing the instructions out of the memory scans in order each of the data packets stored in the buffer and the first set of other data packets except for the at least one data packet,
        each of the data packets stored in the buffer and the first set of other data packets except for the at least one data packet are transmitted to the recipient, wherein the at least one data packet is prevented from being transmitted to the recipient until verification that previous scanned packets when combined with the at least one data packet do not contain an attack pattern.

16. The apparatus of claim 15, wherein:
a second set of data packets in the data stream is received;
at least one data packet from the second set of data packets is identified as a subsequent packet to the at least one data packet;
the second set of data packets and the at least one data packet except for the at least one identified data packet from the second set of data packets are scanned; and
the second set of data packets and the at least one data except for the at least one identified data packet from the second set of data packets are transmitted to the recipient, wherein the at least one identified data packet from the second set of data packets is prevented from being transmitted to the recipient until verification that other previously scanned packets when combined with the at least one identified data packet from the second set of data packets do not contain the attack pattern.

17. The apparatus of claim 15, wherein the a state of pattern matching is stored after one or more data packets of the plurality of data packets of the data stream are scanned.

18. The apparatus of claim 17, wherein each of the one or more data packets are decoded before they are scanned.

19. The apparatus of claim 17, wherein each of the one or more data packets are decompressed before they are scanned.

20. The apparatus of claim 17, wherein the state of pattern matching is tracked by a pointer that points to at least one state in a series of states where each of the states in the series of states from an initial state to an end state correspond to the attack pattern.

* * * * *